Patented Mar. 29, 1938

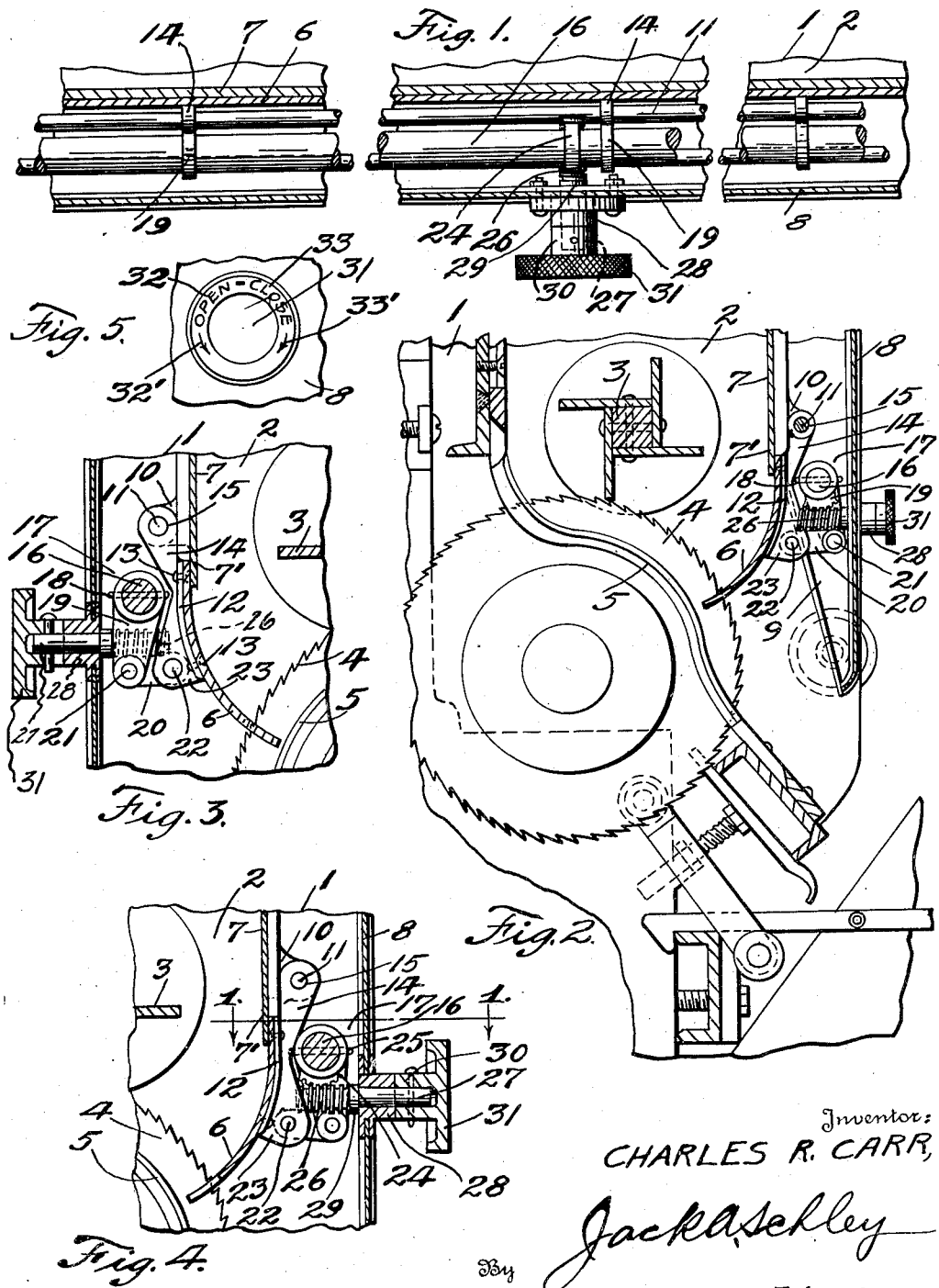

2,112,436

UNITED STATES PATENT OFFICE 2,112,436

ROLL BOX FRONT CONSTRUCTION FOR COTTON LINTERS

Charles R. Carr, Atlanta, Ga., assignor to The Murray Company, Dallas, Tex., a corporation of Texas Application April 23, 1936, Serial No. 75,939

3 Claims. (Cl. 19—61)

This invention relates to roll box front constructions for cotton linters.

One object of the invention is to improve the roll box front construction so as to facilitate the process of manufacture and increase the strength, durability and appearance of the structure by the utilization of metal parts.

A most important object is to improve the means for supporting and adjusting the seed comb.

A further object is to simplify the means of adjusting the seed comb and secure ease of operation and at the same time provide for positively locking the seed comb in its adjusted position.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a fragmentary, horizontal section through the roll box front of a cotton linter in the region of the seed comb and adjusting mechanism, intermediate portions of the structure being broken away to foreshorten the view, the section being taken substantially on the line 1—1 of Figure 4;

Figure 2 is a vertical section, more or less fragmentary, illustrating the mounting of the seed comb and its adjusting means in correlation to the feeder roll and saw elements of the cotton linter;

Figure 3 is a fragmentary sectional view, on an enlarged scale, showing details of the mounting and adjustment of the seed comb;

Figure 4 is a view similar to Figure 3, the parts being viewed in the opposite direction; and Figure 5 is a fragmentary view illustrating indicator means on the manipulating knob of the adjusting mechanism of the seed comb.

Referring now to the drawing, the numeral 1 designates generally the body frame and casing of a cotton linter in the region of the roll box or chamber 2 in which is mounted a feeder roll 3, saw elements 4, rib rails 5 and seed comb 6 which are shown in their working relation to each other.

The roll box front lining or wall 7 is supported in spaced relation to the outer wall or casing plate 8 of the machine by bracket members 9 located at proper intervals throughout the length of said parts 7 and 8.

Supported at its opposite end in brackets 10 provided therefor within the casing of the machine, is a horizontal shaft or rod 11 that extends in spaced parallel relation to the outer face of the wall or lining 7, said shaft or rod 11 being provided to support the seed comb 6 swingably thereon. As shown, the seed comb 6 is provided at intervals throughout its length with hinged members 12 that are secured on the outer face of said comb 6 by bolts 13, as shown, or obviously, said hinged members may be secured thereto in any desirable or approved manner. The hinged members 12 are provided with upwardly extending lugs 14 that are apertured, as at 15, so as to be sleeved on said horizontal supporting shaft or rod 11.

Extending transversely of the machine, in parallel relation to the shaft or rod 11 and in the plane therebelow, is a horizontal rocker shaft 16. Said shaft 16 is rotatably mounted at its end in supporting brackets 17 provided therefor in the casing of the machine, and, obviously, additional supporting brackets 17 may be provided at intervals between the ends of the shaft 16. Pinned, as at 18, on the rocker shaft 16 are depending arms 19, there being one of said arms 19 correlated to each of the hinged members 12 of the seed comb 6. The rocker arms 19 are respectively connected to the hinged members 12 by link elements 20, said elements 20 being respectively pivotally attached, as at 21, to the lower end portions of said rocker arms 19, the opposite end portions of said link elements 20 being pivotally attached, as at 22, to lug portions 23 of said hinged members 12 of the seed comb 6.

By the foregoing described construction and arrangement of parts the seed comb 6 is swung on its supporting shaft 11 towards and from the cooperative saw elements 4 and rib members 5.

In order to facilitate the adjustment of the seed comb 6 and to hold it in its respective adjusted positions, it is preferable to utilize a worm screw and sector. As shown more clearly in Figure 4 of the drawing, the sector, indicated by the numeral 24, is pinned, as at 25, to the shaft 16. The worm screw, indicated by the numeral 26, is in constant mesh with the sector 24 and it is supported by its stem or shank portion 27 which is journaled in the bearing 28 provided therefor on the front wall of the casing of the machine. Outward end thrust of the worm screw 26 is resisted by collar 29 provided thereon and abutting the journal bearing member 28 and inward longitudinal movement of the worm screw is prevented by the hub portion 30 of the knob member 31 which is pinned on the stem or shank portion 27. By turning the knob member 31 in one direction, clockwise for example, the seed comb 6 is moved inwardly or towards the saw element 4 and ribs 5, and obviously, by turning the knob in a counter-clockwise direction, the comb 6 is moved outwardly or away from the saw element 4 or ribs 5. The meshing of the toothed sector 24 with the worm screw 26 holds the seed comb 6 in the position to which it has been adjusted by manipulation of the worm screw.

Preferably, the lower portion of the roll box front plate 7 is free of support, as at 7', and the metal of which it is made, being somewhat inherently resilient, it is sprung and given the normally outward set so that the lower marginal portion of the plate 7 normally bears against the inner upper marginal portion of the seed comb 6, said freely depending portion 7' of the plate 7 yielding inwardly when the comb 6 is moved inwardly towards the saw elements 4 and rib members 5 and also moving outwardly in contact with the comb 6 when the latter is moved outwardly or away from said saw elements 4 and rib members 5 in effecting the desired adjustment of the seed comb 6. It is thus apparent that the comb portion 6 of the roll box front is movable on the front plate 7 without disturbing the working contact between the lower marginal portion of the plate 7 and the upper marginal portion of the comb 6 because of the resiliency of the portion 7' of the plate 7 and the normal outward set thereof, as hereinbefore described, whereby said portion 7' follows in contact with said comb 6 in its outward movement and yielding to the inward movement of said comb member 6, the adjustment begin effected, at will, by the operator manipulating the knob member 31 which is conveniently located on the outside of the casing of the machine and preferably provided with an indicator dial or indexing means, a practical example of which is illustrated in Figure 5 of the drawing, wherein the knob member 31 has the word "Open" marked thereon together with a correlated arrow, as indicated at 32, 32', respectively. By turning the knob in the direction indicated by the arrow 32' the seed comb 6 is opened or moved in the direction away from the saw elements 4 and ribs 5. Knob member 31 also has the word "Closed" thereon and the correlated arrow, as at 33, 33', indicating the direction to turn the knob when it is desired to close the seed comb 6 or move it towards the saw elements 4 and ribs 5.

What I claim and desire to secure by Letters Patent, is:

1. In a cotton linter, in combination with cooperative roll box elements, including a hingedly supported seed comb, and means for swingably adjusting said seed comb towards and from its cooperative elements, said means comprising a transverse horizontal rocker shaft, a series of depending rocker arms fixed on said shaft to move therewith, horizontal link members pivotally connecting the respective rocker arms directly with said seed comb, a toothed sector secured on said rocker shaft to move therewith, a horizontal worm screw meshing with said toothed sector whereby to normally hold the sector from movement but actuating the sector when the worm screw is rotated in either direction, and a manipulating member fixed on said worm screw externally of the machine.

2. In a roll box front and seed comb construction, in combination, a roll box front wall plate vertically disposed with its major upper portion rigidly supported throughout but its extreme lower portion being inherently resilient and free of support other than said rigidly supported upper portion and given a predetermined sprung set in one lateral direction, a seed comb pivotally supported with its extreme upper portion in cooperative relation to and constantly in contact with and subject to the spring effect of the lower portion of said roll box front wall plate in every position of the comb, and means for movably adjusting said seed comb inwardly and outwardly on its pivotal axis, said adjusting means having provision for holding said seed comb in its respective adjusted positions.

3. In a cotton linter, in combination, a roll box, a feeder roll therein, rib members constituting a grate-like bottom for said roll box, saw elements operating between the respective rib members, the roll box having a vertically disposed front wall plate rigidly supported throughout its upper portion and its bottom edge portion terminating in spaced relation above said rib members, said bottom edge portion being inherently resilient and normally deflected in one lateral direction, an arcuate seed comb hingedly supported with its upper edge portion in constant contact with and subject to the spring effect of said roll box front wall plate in every position of the comb, and worm screw and gear means having a horizontal link connection with said seed comb and provided with a manipulating handle externally of the machine for swingably adjusting the seed comb towards and from said saw elements and for holding the seed comb in its respective adjusted positions.

CHARLES R. CARR.